Patented Aug. 20, 1929.

1,725,245

UNITED STATES PATENT OFFICE.

ROBERT BATES, OF ATHENS, TENNESSEE.

CLEANER AND POLISH.

No Drawing.     Application filed June 23, 1927. Serial No. 201,033.

The invention relates to a preparation for cleaning and polishing painted, varnished and lacquered surfaces, also for cleaning and polishing glassware, chinaware, metalware and the like, and that is useful for removing grease spots from upholstery, clothing and other fabrics.

By my Patent No. 1,305,684, of June 3, 1919, I introduced into the art of polishes the gum of chicken-grape vines mixed with water and alcohol. This preparation has limited detergent properties and, as stated in the patent, is designed particularly for glass and chinaware, household utensils, and all kinds of metals. Because of the presence of alcohol in the preparation it is unsuited for use in treating painted, or varnished, or lacquered surfaces. Furthermore in treating coated surfaces a higher degree of detergent properties is required to perform satisfactory work.

My invention, therefore, has for its object the provision of a cleaner and polish comprising a solution of the gum of chicken-grape vines (*Vitis cordifolia*), prepared with saponaceous materials, preferably a neutral soap, with a small quantity of table salt, and bicarbonate of soda, thoroughly mixed, and prepared in the condition of a bar or cake, that is adapted to be used with water for cleansing and polishing painted, varnished, and lacquered surfaces, and that is also adapted for use in cleaning generally wherever a luster is to be imparted to the article treated, such as glass, china and metal ware, and that will also eradicate grease spots from upholstery, clothing and other fabrics.

In preparing the composition I proceed as follows:

I take the body of the wild-grape vine growing near a running stream or in wet land, commonly known as chicken grape, and known botanically as *Vitis cordifolia*, cut it into pieces about four inches in length, strip the bark therefrom and cut the body into strips so that the gum will exude therefrom. These strips are placed in water. The water will cause the gum to exude from the strips and will resemble the white of an egg. The strips are then taken out and the gum adhering thereto scraped into the solution. Should the gum become lumpy after removal of the strips the solution should be thoroughly stirred and if necessary more water added to dissolve the lumps. After setting aside for about ten hours the solution should be about the consistency of egg albumen, specific gravity 1.0006 at 20° C., but if too thick or lumpy more water should be added to dissolve the lumps and reduce it to the consistency stated. In event the solution is thinner than the consistency stated it may be used as hereinafter described.

In making the cleaner and polish I take a five ounce cake of soap and one gill of the grape vine gum solution and heat it slowly over a low fire stirring constantly from the bottom. The soap will soon absorb the solution. Then add another gill of the solution continuing to stir constantly, while it is dissolving the soap another gill of the solution is added, and also one teaspoonful of table salt and the same quantity of soda bicarbonate, and still subjecting the mixture to heat as before and stirring constantly, any lumps will soon disappear, the salt and soda having this effect on the mixture. It will then be of the consistency of a thick smooth paste. After it has cooled it is worked into a suitable bar and dipped into a salt brine to make the bar firm and hard so that a suitable wrapper placed thereon will not stick to the bar. The article is then ready for use.

In using the preparation rub the bar in water until the water is discolored. A quart of water so prepared will clean and polish an automobile of any size. The aqueous solution thus prepared is applied with a soft rag or sponge, wetting not more than two feet square at a time, and immediately dried with a soft, dry cloth, preferably cheese cloth, or with chamois.

The cleaning and polishing is done during the drying operation as described. If the surface does not become clean in the first operation, wet with the solution and dry again. When the cloth or chamois is run smoothly over the surface it is thorough cleaned and should not again be wet. In drying, turn the cloth or chamois frequently so that there is a clean part thereof against the surface. After the surface has been cleaned and dried, should it lack luster, rub it with a dry soft sponge. The same solution may be used for cleaning and polishing any painted or varnished surface, also glass and metal ware and may be used as a general cleaner whenever a luster is desired. The preparation may also be used for removing grease spots from upholstery, clothing and the like by moistening the spots and rubbing them with the bar and then rinsing with a wet cloth or sponge.

What is claimed is:—

A cleaner and polish, consisting of three gills of a solution of the gum of chicken-grape vine (*Vitis cordifolia*) in water, specific gravity 1.0006 at 20° C., five ounces of neutral soap, one teaspoonful of salt, and one teaspoonful of soda bicarbonate.

In testimony whereof I affix my signature.

ROBERT BATES.